United States Patent [19]

Färber

[11] Patent Number: 5,088,642
[45] Date of Patent: Feb. 18, 1992

[54] CONTAINER FOR LIQUIDS AND BULK MATERIALS

[75] Inventor: Jürgen Färber, Kaarst, Fed. Rep. of Germany

[73] Assignee: PKL Verpackungssysteme GmbH, Dusseldorf, Fed. Rep. of Germany

[21] Appl. No.: 607,896

[22] Filed: Nov. 1, 1990

[30] Foreign Application Priority Data

Dec. 21, 1989 [DE] Fed. Rep. of Germany ....... 3942319

[51] Int. Cl.⁵ ........................................... B65D 43/08
[52] U.S. Cl. .............................. 229/125.14; 229/4.5; 229/125.04; 229/125.13; 215/232
[58] Field of Search .................... 229/3.1, 4.5, 125.01, 229/125.04, 125.13, 125.14, 125.17; 206/601, 613, 634; 215/232; 222/572

[56] References Cited

U.S. PATENT DOCUMENTS

| | | | |
|---|---|---|---|
| 512,581 | 1/1894 | Greene | 229/125.14 |
| 890,771 | 6/1908 | Iwanami | 229/3.1 |
| 1,100,448 | 6/1914 | Selz | 229/4.5 |
| 1,166,862 | 1/1916 | Smoot | 215/31 |
| 1,724,517 | 8/1929 | Rudd | 229/4.5 |
| 1,886,698 | 11/1932 | Lake | 229/4.5 |
| 1,898,112 | 2/1933 | Wright | 229/4.5 |
| 1,912,884 | 6/1933 | Boder | 229/4.5 |
| 1,995,703 | 3/1935 | Clark | 229/3.1 |
| 2,132,672 | 10/1938 | Berry | 229/4.5 |
| 2,162,116 | 8/1938 | Kasdorf | 229/4.5 |
| 2,282,000 | 5/1942 | Rittmann | 229/3.1 |
| 2,287,644 | 6/1942 | Schacht | 229/4.5 |
| 2,321,313 | 6/1943 | Pelzer | 229/4.5 |
| 2,321,314 | 6/1943 | Pelzer | 229/4.5 |
| 2,322,213 | 6/1943 | Amberg | 229/45 |
| 2,323,078 | 6/1948 | Pelzer et al. | 229/4.5 |
| 2,643,815 | 6/1953 | Komeo . | |
| 3,656,668 | 4/1972 | Liebertz | 215/31 |
| 3,944,130 | 3/1976 | Smith . | |
| 3,951,295 | 4/1976 | Guenther | 220/601 |
| 4,256,154 | 3/1981 | Black | 215/31 |
| 4,972,568 | 11/1990 | Schurr | 220/601 |

FOREIGN PATENT DOCUMENTS 0223094  5/1987  European Pat. Off. .
2205805 12/1988  United Kingdom .

Primary Examiner—Gary E. Elkins
Assistant Examiner—Christopher McDonald
Attorney, Agent, or Firm—Marmorek, Guttman & Rubenstein

[57] ABSTRACT

A container for liquids and bulk materials is made from a blank having a plurality of sets of folding lines thereon. The container comprises a substantially parallelipipedic body having side walls and laterial edges between the side walls, the lateral edges comprising a first set of folding lines of the blank, and a funnel-shaped portion on top of the body comprising faces extending from the side walls, the head portion tapering in cross-section towards a central annular opening of predetermined shape. The head portion further comprises triangular folding pockets folded inwardly along a second set of folding lines towards the interior of the head portion and outwardly along a third set of folding lines so that the folding pockets are disposed in pairs and bear along interior surfaces of the faces. The folding pockets are sealed to the interior surfaces along the interior folds and along upper edges of the folding pockets so that the folding pockets are closed off to the interior of the head portion. The container further comprises a spout or an adapted for a spout and a flange disposed on the funnel-shaped head portion from the interior of the container. The spout or adapter and the flange are shaped to conform to the predetermined shape of the central annular opening. Preferably, the container is made from a cardboard material, or a cardboard/plastic multi-layer composite material.

17 Claims, 8 Drawing Sheets

CONTAINER FOR LIQUIDS AND BULK MATERIALS

BACKGROUND OF THE INVENTION

The invention relates to a container for liquids and bulk materials in the form of a substantially parallelipipedic folding box made from cardboard, preferably from a cardboard/plastic multi-layer composite material. The container has a head portion which tapers in cross-section due to the formation of folding pockets and has the shape of a funnel with a central opening equipped with an annular shaped member.

In a prior art container of the kind specified, for example, in the container described in U.S. Pat. No. 2,321,314, the annular shaped portion engages around the top edge of the central opening on both sides and acts as a reinforcement for the edge and as an adapter for a cover closure which can be placed thereon. In the tapering head portion, two triangular folding pockets are associated with each folding line, extending into the head portion of the container, of four parallel container edges. These folding pockets lie on the outside of the head portion, so that a substantially stepless rounding of the central opening is produced inside. Due to its bowl-shaped cover, such a container is not designed or intended to be reclosed after a small quantity of the contents has been removed.

Liquids used in only small quantities in homes and industry nowadays are almost exclusively kept in plastic containers having closable spouts. Since the disposal of plastic products causes problems, for many years containers in the form of folding boxes made from a heat-sealable cardboard/plastic multi-layer composite material have been used for products, such as beverages, which are consumed not in small quantities, but all at once. However, such containers have not acquired any practical importance in connection with products that are used only in a small quantity at a time, due to the difficulty of equipping the containers with suitable spouts.

In a known container of the kind specified initially, the head portion is designed in the form of a gable roof, the spout being sealed either from inside or outside by a flange on a side of the gable roof (see, e.g., European Patent 0224539 A1, German Patent Specification 3 039 299 A1, and German Patent Specification 3 831 412 A1). A disadvantage of such containers is that they cannot be completely emptied, since the spout is placed on one side of the gable roof and not at the lowest point of the inverted container.

In contrast, another prior art container described in European Patent 0223094 A2 made from a cardboard/plastic multi-layer composite material can be completely emptied. In that container the head portion is funnel-shaped and comprises a spout inserted in the funnel-shaped portion. The funnel-shaped head portion is formed by a number of cut-out triangular areas of the cardboard blank, whose adjacent edges are interconnected via sealing seams. A disadvantage of that container is that due to the cut-out triangular areas, the funnel-shaped head portion cannot be produced without causing waste.

SUMMARY OF THE INVENTION

It is an object of the present invention to provide a container for liquids and bulk materials in the form of a folding box of the kind specified initially which is equipped with a spout which can be readily produced, and which also secures the spout adequately against rotation.

This problem is solved according to the invention by providing a container for liquids and bulk materials made from a blank having a plurality of sets of folding lines thereon. The container comprises a substantially parallelipipedic body having side walls and lateral edges between the side walls, the lateral edges comprising a first set of folding lines of said blank, and a funnel-shaped portion on top of said body comprising faces extending from the side walls, the head portion tapering in cross-section towards a central annular opening of predetermined shape. The head portion further comprises triangular folding pockets folded inwardly along a second set of folding lines towards the interior of the head portion and outwardly along a third set of folding lines so that the folding pockets are dispersed in pairs and bear along interior surfaces of the faces. The folding pockets are sealed to the interior surfaces along the interior folds and along upper edges of the folding pockets so that the folding pockets are closed off to the interior of the head portion. The container further comprises a spout or an adapter for a spout and a flange disposed on the funnel-shaped head portion from the interior of the container. The spout or adapter and the flange are shaped to conform to the predetermined shape of the central annular opening. Preferably, the container is made from a cardboard material, or a cardboard/plastic multi-layer composite material.

The head portion has high rigidity, not only due to its funnel-shaped construction, but more particularly due to the spout or adapter, which is disposed from inside the funnel-shaped head portion with a shaped-on flange. The adaptation of the shape of the flange to the inside folding pockets produces a positive connection which, combined with the other attaching means, gives the adapter or spout satisfactory security against rotation. The four inside folding pockets, located on opposite areas of the head portion permit folding on flat surfaces, something which is simpler to achieve in manufacturing technique than shaping on a conical mandrel. The lateral seam produced by making the tubular body from a rectangular blank can be covered in known manner by a covering strip or protected by the knocked-in inner edge of the blank.

According to another aspect of the invention, the rigidity of the head portion and the attachment of the spout or adapter thereto can be further enhanced by the feature that the spout is disposed with a shaped-on flange from inside the funnel-shaped head portion, the shape of the spout being adapted to the inside of the head portion with the folding pockets. In addition to retention by the other attaching means, a positive closure is obtained due to the adaptation of the shape, more particularly to the folding pockets.

Preferably the spout o adapter is sealed to the material of the cardboard. Also advantageously the flange has a circularly extending sealing lip which can be made of a heat-sealable material, something which encourages the hermetic connection of the spout to the cardboard. To improve appearance, the top edge of the opening in the head portion can be covered by a masking ring disposed on the spout or adapter.

To facilitate the shaping of the head portion, according to a further feature of the invention, extending from each of the origins of the folding lines is an extra folding line, which lies parallel and next to the central folding line when the folding pocket is closed.

In the case of a container of parallelipipedic cross-section, a substantially symmetrical head portion with a small opening is obtained if the angles enclosed by the radiating folding lines are of the same size, the adjacent folded lines radiating from adjacent folding lines for the lateral edges of the body impinging on one another adjacent the edge of the opening.

To minimize the danger that during the folding of the funnel-shaped head portion the lateral seam produced during the making of the container from the rectangular blank will split, according to another feature of the invention, the lateral seam lies at the edge of the opening and outside the folding lines, which during the folding of the head portion are folded by more than 90°, more particularly the lateral seam should lie outside the folding pockets.

The invention also relates to a method of producing a container according to the invention which is characterized by the following steps:
1) In a tubular cardboard body of rectangular cross-section, the end zones of each pair of opposite areas are folded together gable-roof-shaped, with the formation of two triangular folding pockets at each gable.
2) The folding pockets are folded on to the two areas forming the gable roof sides and stapled thereto.
3) A spout or an adapter for a spout is introduced from the inside of the tubular body into the head portion formed by the areas of the gable roof sides and the areas of the gables and into the funnel-shaped head portion formed as a result, partially inserted through its opening, and sealed to its inside.
4) At its end remote from the spout, the tubular body is closed by a sealed-over or sealed-in cover or by a web seam sealing with subsequent folding of the resulting lugs on to the bottom.

The invention also relates to an apparatus for the performance of the method. It is characterized by a lower tool, a shaping mandrel for forming the spout, two gable-shaping plates which can move in relation to the shaping mandrel and are disposed at opposite sides thereof, and a punch disposed for axial movement in the shaping mandrel; and a number of upper tools in the form of folding tools for the gable roof folding and the folding pockets, and in the form of activating and sealing elements for the sealing of the folding pockets and the spout.

BRIEF DESCRIPTION OF THE DRAWINGS

The invention will now be described with reference to the drawings, wherein:

FIG. 23 shows the individual steps for producing the body and inserting the spout using the shaping tool shown in FIGS. 20-22 and also folding and activating elements.

DETAILED DESCRIPTION OF PREFERRED EMBODIMENTS

Figures 1, 3:
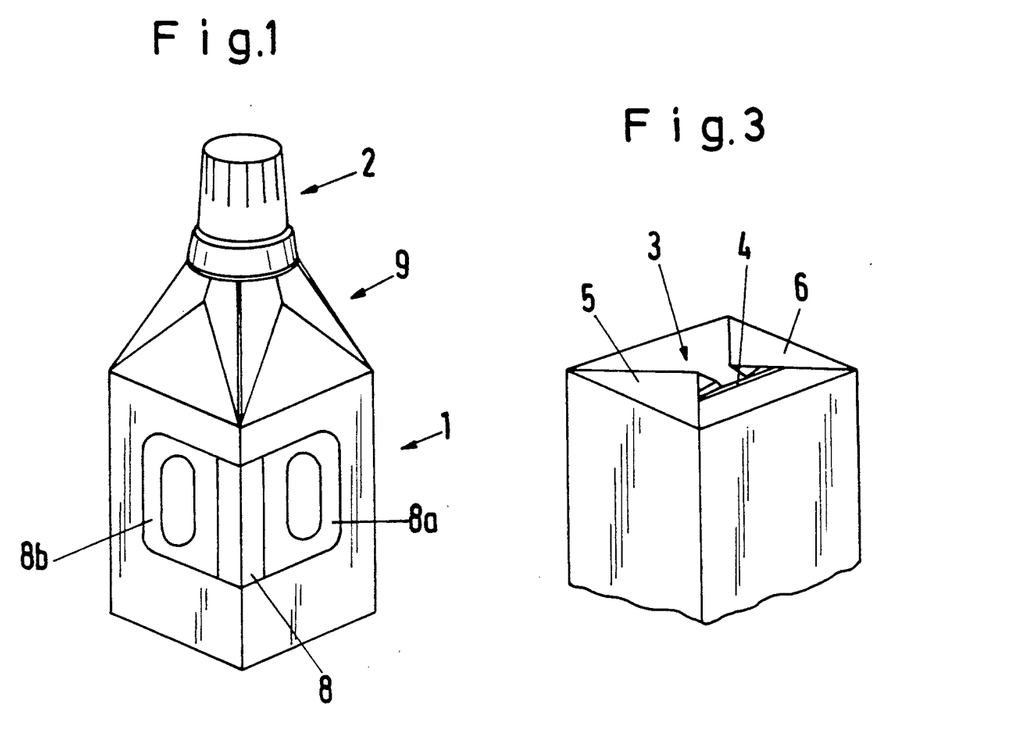
FIG. 1 is a perspective view of a container according to the present invention.
FIG. 3 is a perspective view of the bottom of the container shown in FIG. 1.
Figure 2:
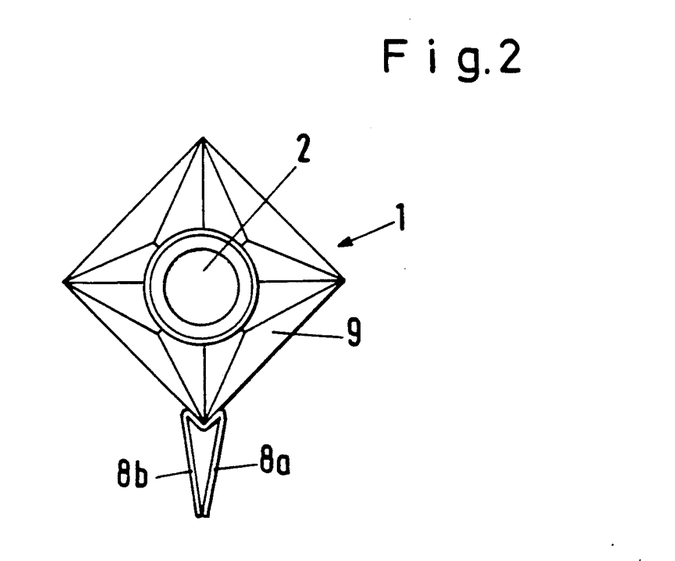
FIG. 2 is a plan view of the container shown in FIG. 1.

Referring to FIGS. 1 to 3, a container according to the present invention comprises a body 1 and a spout 2 closed by a cap which can be screwed or placed on the spout. The body i takes the form of a folding box and is made from a rectangular, waste-free blank, such as that illustrated in FIG. 4. The material used for the blank is preferably a heat-sealable, cardboard/plastic multi-layer composite material with or without an aluminum insert. The bottom 3 of the container is closed in known manner by a web seam 4. Resulting lugs 5, 6 are folded inwards on to the bottom and sealed on, as shown in FIG. 3. A strap 8 having handle flaps 8a, 8b is sealed onto one lateral edge of the body 1. For transport purposes the handle flaps 8a, 8b lie flat against the lateral walls of the body 1, as shown in FIG. 1, while they can be folded outward for use, as shown in FIG. 2.

Figures 4, 5, 6:
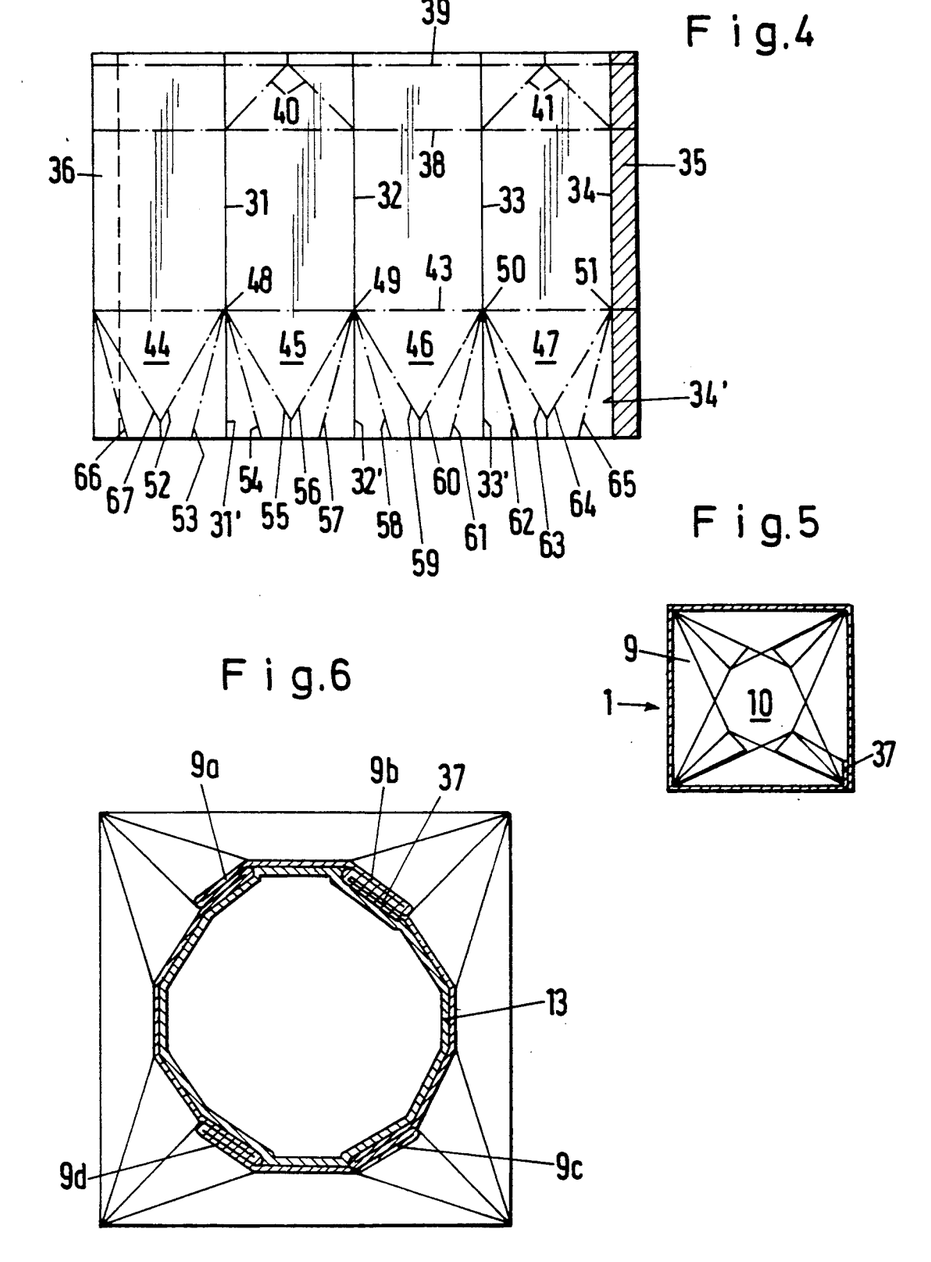
FIG. 4 shows a blank from which the container illustrated in FIG. 1 having a square cross-section is made.
FIG. 5 is a bottom view of a body made from the blank shown in FIG. 4, prior to the insertion of a spout and closure of the bottom, the body having a lateral seam extending along one lateral edge of the body.
FIG. 6 is an enlarged view of the body shown in FIG. 5 in cross-section through a spout which has been inserted.

The head portion 9 of the body 1 is funnel-shaped through the formation of folding pockets 9a, 9b, 9c, 9d (see FIG. 6). Head portion 9 has a central opening 10 (see FIG. 5), into which mouthpiece 11 or 12 of the spout 2 is inserted from below, as shown in detail in FIGS. 12 to 15. The mouthpiece 11 or 12 has a conical flange 13 or 14 sealed to the inside of the funnel-shaped head portion 9. To facilitate the sealing and hermetic closure of the mouthpiece, the flange 13 or 14 can be equipped with hermeticizing and sealing lips 15, 16. More particularly, as shown in FIG. 6, the shape of the flange 13 is adapted to the shape of the inside of the funnel-shaped head portion 9 having the folds and folding pockets 9a, 9b, 9c, 9d, so that a positive connection is formed, in addition to the sealing connection between the flange 13 and the head portion 9.

Figures 12, 13, 14:
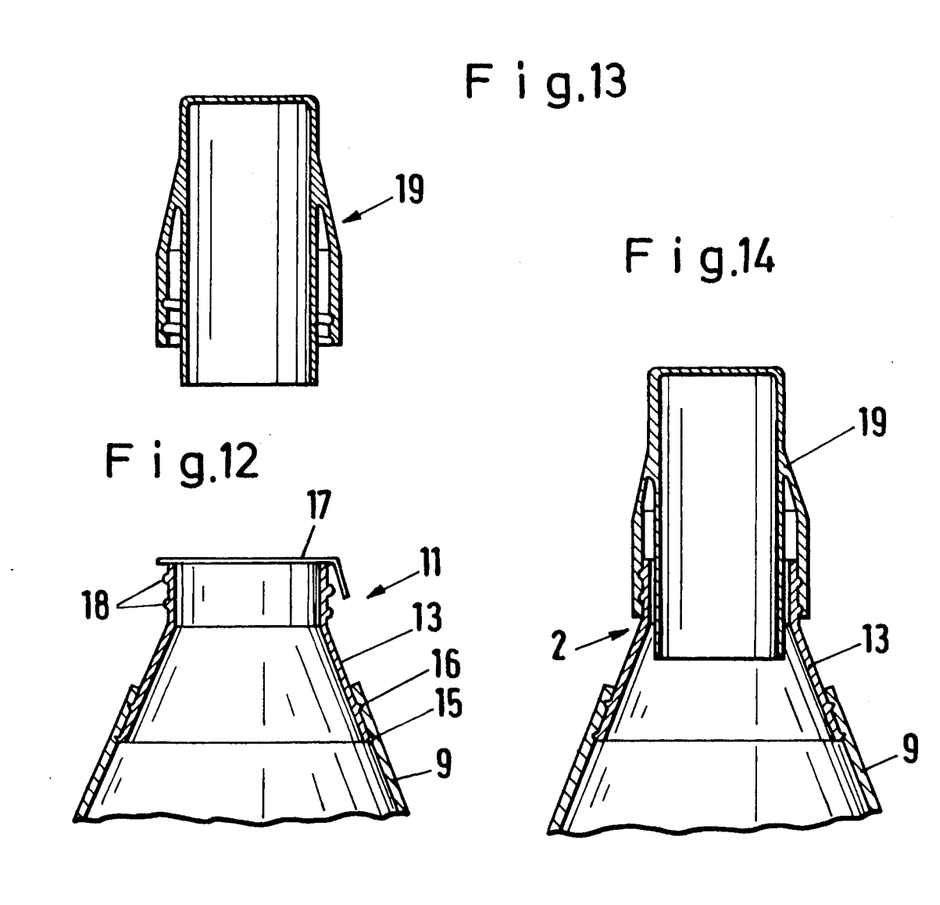
FIG. 12 is an axial section through the head portion of the container shown in FIG. 1 with a spout.
FIG. 13 is an axial section through a screwed closure for the spout shown in FIG. 12.
FIG. 14 is an axial section through the head portion of the container shown in FIG. 1 with spout and applied screwed closure as shown in FIGS. 12 and 13.

The mouthpiece 11 shown in FIG. 12 is closed by a glued-on strap closure 17. If the mouthpiece 11 is equipped with an externally screw-threaded sleeve-formed attachment 18 (FIGS. 12 and 14), the mouthpiece can be closed by a screwed-on cap 19 when the strap closure 17 has been removed or if there is no strap closure 17. The cap 19 can take the form of a metering cap (FIGS. 13 and 14).

Figure 15:
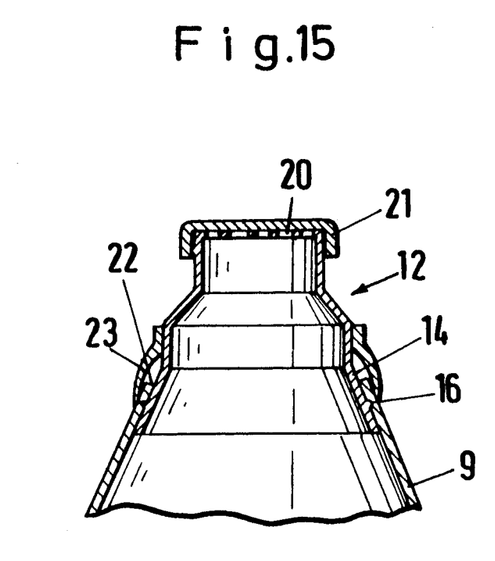
FIG. 15 is an axial section through the head portion of a container as shown in FIG. 1, with a spout constructed as a sprayer and closed by a cap.
Figures 16, 16A:
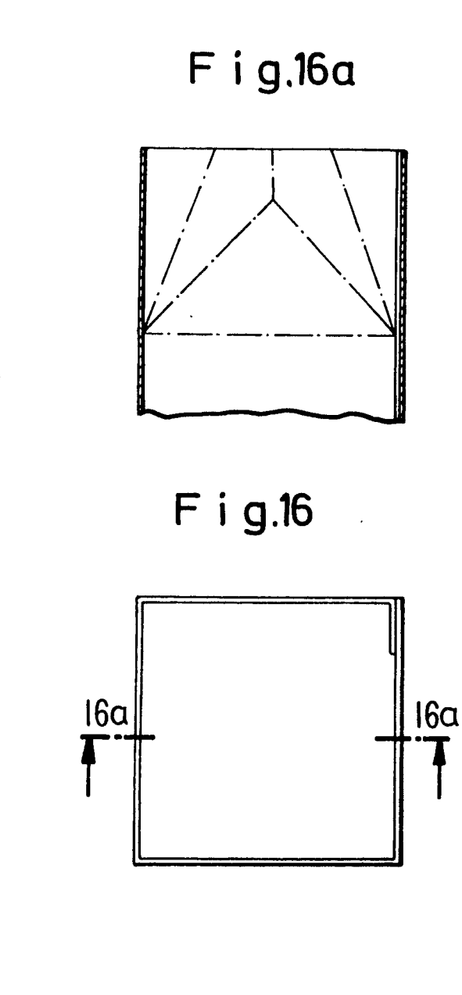
FIGS. 16 to 19 and 16a to 19a show the head portion of the container illustrated in FIG. 1 at different phases of production, in each case in plan view and axially sectioned along the line A—A in FIG. 16.

The mouthpiece 12 shown in FIG. 15 is constructed as a sprayer having a perforated plate 20 at its ends. The mouthpiece 12 can be closed by placing a cap 21 on it. In contrast with the embodiments shown in FIGS. 12 to 14, in that illustrated in FIG. 15 the free edge 22 of the head portion 9 is covered by a masking ring 23 disposed on the mouthpiece 12.

To make the body 1 shown in FIG. 1, one starts with a rectangular blank as shown in FIG. 4. Extending over the whole height of the blank are four folding lines 31 to 34 which become the lateral edges in the central portion of the body 1. The body 1 is first formed into a tube while zones 35 and 36 form at the two side walls of the blank a seam, namely a corner seam 37 of the body 1. A folding line 38 extends across the whole width of the blank for forming the folding bottom 3 of the body 1. The folding line 38 becomes a supporting edge which circumscribes the bottom 3. The web seam 4 is bounded by a further folding line 39 extending over the whole width of the blank. For the formation of the lugs 5, 6 of the bottom 3, which are to be folded inwards, folding lines 40, 41 are disposed in two opposite bottom areas of the body 1 and subdivide said bottom areas into triangular areas.

The head portion 9 is bounded by a folding line 43 extending across the whole width of the blank. A number of folding lines 31' to 34' and 52 to 67 radiate from each of the points of intersection 48 to 51 of the folding lines 31 to 34 and the folding line 43 and extend through rectangular areas 44 to 47. The adjacent folding lines 52, 55, 56, 59, 60, 63, 64, 67 starting from the adjacent points of intersection 48 to 51 impinge upon one another adjacent the outer peripheral edge of the blank, which forms the edge 22 of the opening 10 of the body 1. However, they can also meet together at the peripheral edge or be at a distance from one another at that place. This depends on the geometry of the body and the mouthpiece. The angles enclosed by the folding lines 31' to 34' and 52 to 67 are substantially equal to one another.

In the pleat-like folding of the head portion 9, the closed i.e., not necessarily fully sealed folding pockets 9a, 9b, 9c, 9d (FIG. 6) are formed from the substantially triangular areas lying between the folding lines 31, 54, 55; 32, 56, 57; 33, 62, 63; and 34, 64, 65; the lengths and portions of the folding lines 31–34 lying in the inside of the head portion 9. The result is the formation of a funnel-shaped head portion 9 having a central octagonal opening 10 into which the spout 11, adapted in shape by its flange 13, can be inserted from below. At least at the edge 22 of the opening 10 the areas 35, 36 for the lateral seam 37 do not lie in the zone of a folding line, so that the loading of the lateral seam 37 is non-critical at this critical place.

Figure 7:
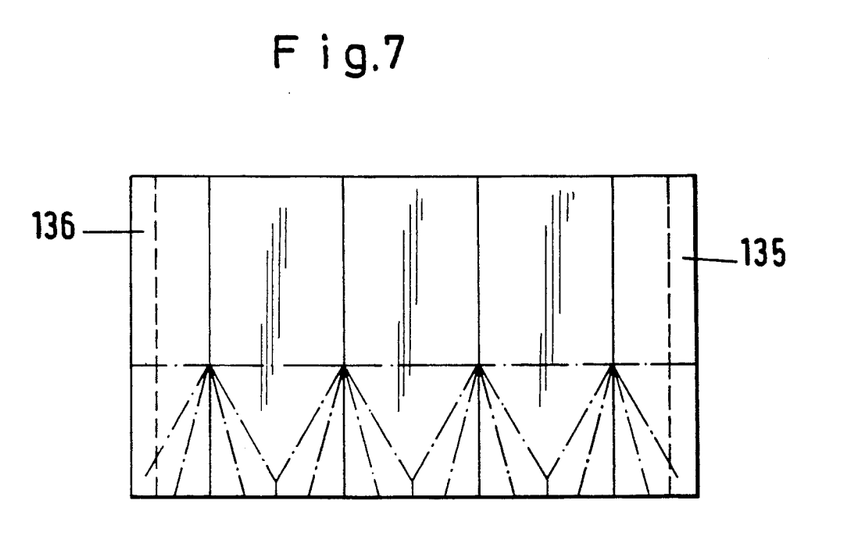
FIG. 7 shows a blank for a container of square cross-section as a variant of the container shown in FIG. 1.
Figure 8:
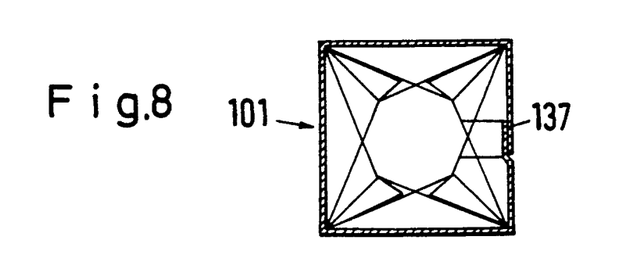
FIG. 8 is a bottom view of a body made from the blank shown in FIG. 7 prior to the insertion of a spout and closure of the bottom, the body having a lateral seam extending in the middle of a lateral wall area of the body.
Figure 9:
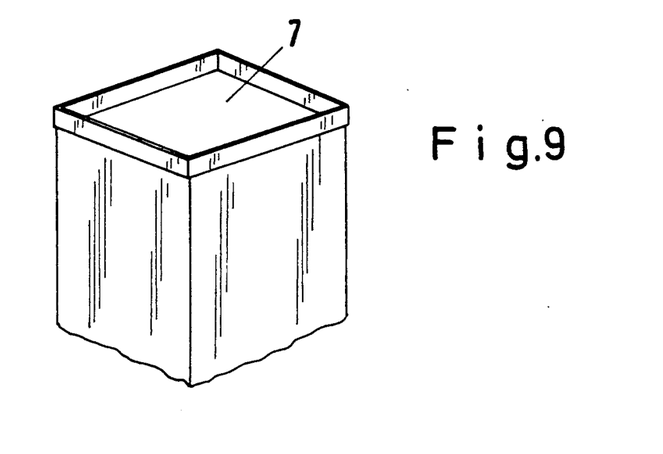
FIG. 9 is a perspective view of the sealed-in bottom of the container made from the blank shown in FIG. 7.

The embodiment illustrated in FIGS. 7 to 9 differs from that shown in FIGS. 4 to 6 solely by the feature that the blank is constructed not for a folding bottom, but for a bottom 7 which can be sealed in (FIG. 9), the areas 135, 136 for the seam 137 lying not on a lateral edge of the body 101, but at the center between two lateral edges. As in the previous embodiment, conditions in this case are also such that the seam 137 at the cutting edge does not lie in the zone of a folding line which must be folded strongly.

Figures 10, 11:
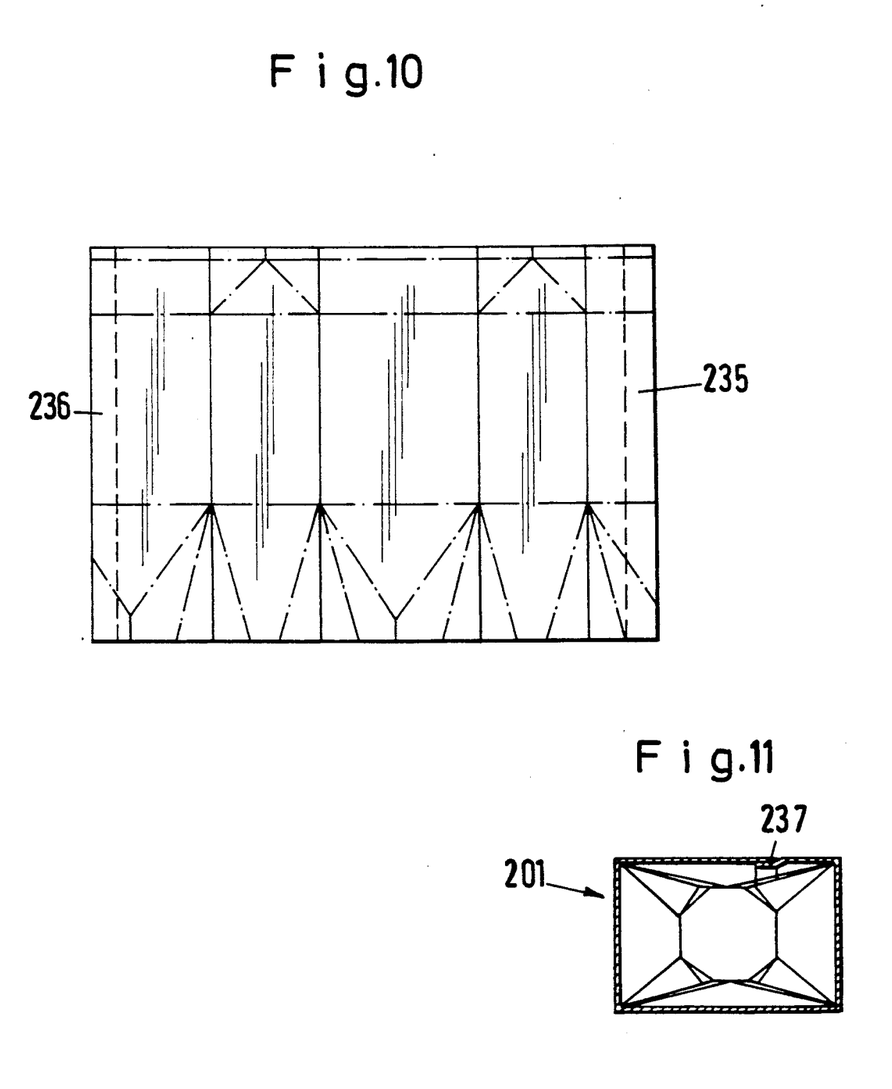
FIG. 10 shows a blank for a container of rectangular cross-section.
FIG. 11 is a bottom view of a body made from the blank shown in FIG. 10 prior to the insertion of a spout and closure of the bottom, the body having a lateral seam extending between the lateral edges.

The embodiment illustrated in FIGS. 10 and 11 differs from that shown in FIGS. 4, 5 and 6 by the feature that the blank is designed not for a container square in plan, but for a container rectangular in plan and having sides of different widths, the seam 237 formed by areas 235, 236 being disposed at a distance from the lateral edges of the body 201. Another difference is that there are no folding lines corresponding to the folding lines 52, 59, 60, 67 of the blank shown in FIGS. 4 and 7. Since in contrast with the folding lines 31, to 34', 54 to 57, and 62 to 65, these folding lines are not required for the folding pockets, but are merely intended to facilitate the folding and/or shaping of the funnel-shaped head portion, their absence has no particularly disadvantageous effects. In contrast, the folding lines 53, 58, 61, 66 are more important, since they contribute towards relieving the outer folding pockets in the shaping-up of the head portion. Finally, the blank is designed for a folding bottom as shown in FIG. 3, and not for a sealed-on bottom, as shown in FIG. 9.

Figure 20:
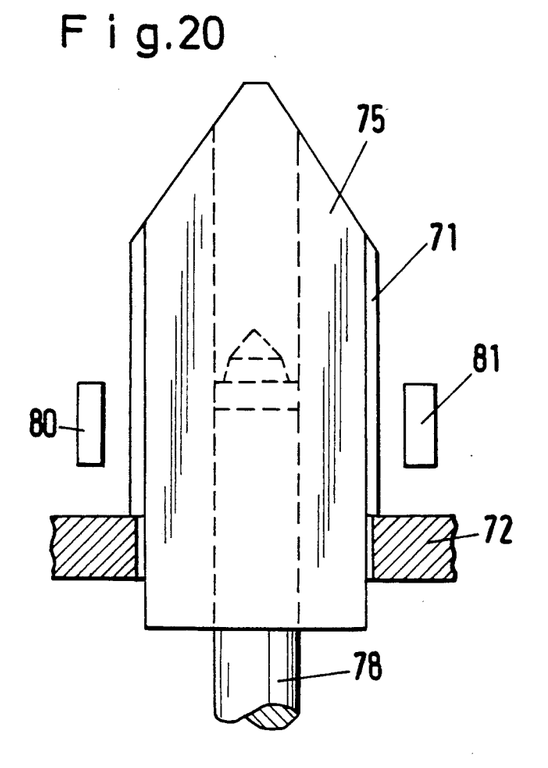
FIG. 20 is a side elevation of a shaping tool for producing a container as shown in FIG. 1.
Figure 21:
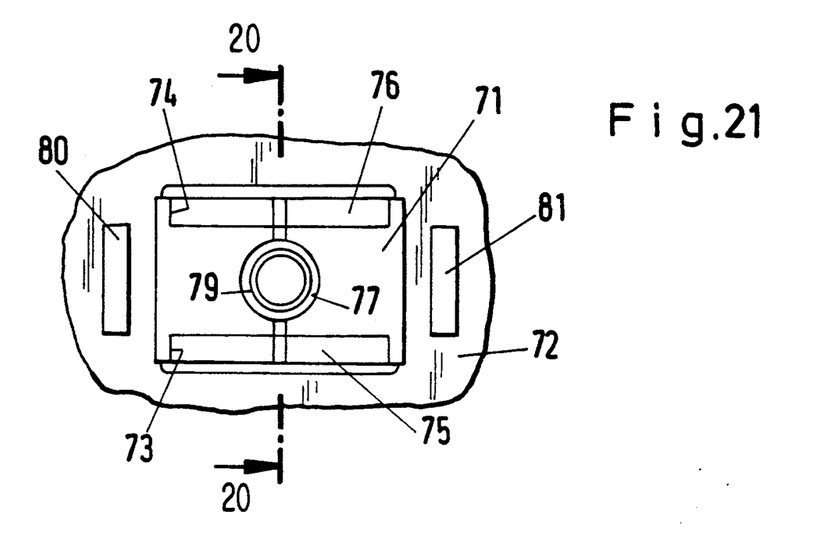
FIG. 21 is a plan view of the shaping tool shown in FIG. 20.
Figure 22:
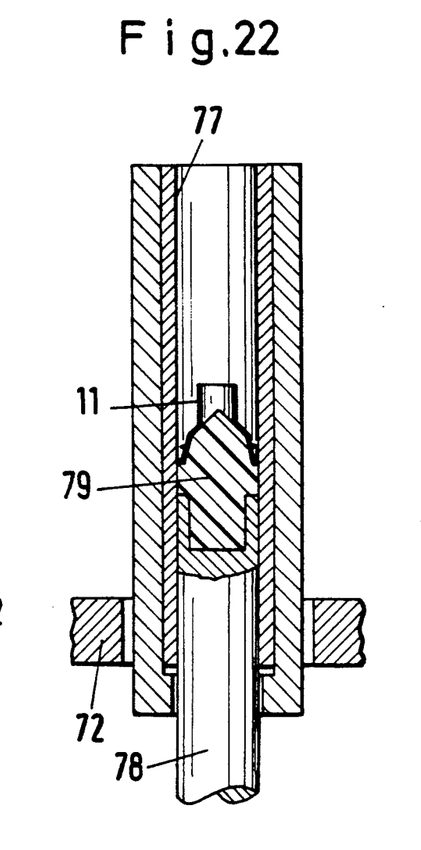
FIG. 22 shows the shaping tool illustrated in FIG. 20, axially sectioned along the line B—B in FIG. 21.

The tool shown in FIGS. 20 and 21 is used for the folding and sealing of the head portion 9 and the insertion and attachment of the spout 2. The tool comprises a shaping mandrel 71 of rectangular cross-section which is fixedly disposed on a plate 72 and is formed on opposite sides with recesses 73, 74 in which gable-shaped shaping plates 75, 76 are longitudinally displaceably mounted. The shaping mandrel 71 is formed with a central recess 77 in which a punch 78 can move longitudinally. The punch 78 has a shaping head 79 on which the spout 2 can be placed in a given position of rotation. Clamping jaws 80, 81 are associated with the free sides of the shaping mandrel 71.

A process to produce the head portion 9 with such a tool is shown in FIG. 23. With the clamping jaws 80, 81 opened, the tubular body 1 made from the blank shown in FIG. 4 is placed on the shaping mandrel 71 with the gable-shaped shaping plates 75, 76 in the top position and clamped by the clamping jaws 80, 81 (FIG. 23, operating steps 1 and 2).

Before this or afterwards, with the punch 78 raised, the mouthpiece 11 closed with the cap 19 is placed on the shaping head 79 in the position corresponding to the folding pockets and the lateral seam, and the punch 78 again moved inwards (FIG. 23, operating steps 2 and 3).

Then, by means of an element 82 to be moved into the tubular body 1, the heat-sealable zones of the pockets 9a, 9b, 9c, 9d to be formed are activated on the inside, for example, with hot air (FIG. 23, operating step 4).

Figure 17:
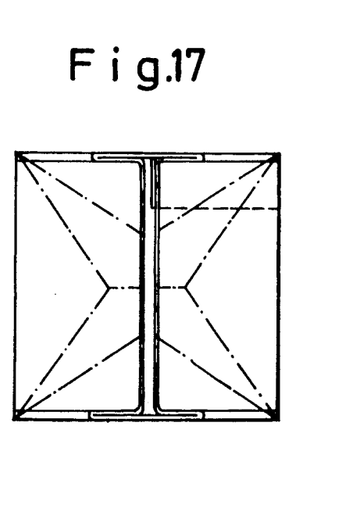
Figure 17A:
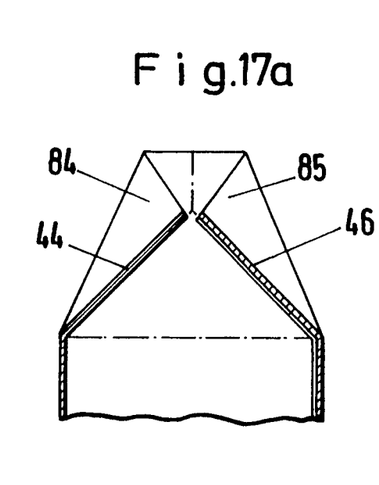

Using folding tools 83, the areas 44, 46 lying between the two gable-shaped shaping plates 75, 76 (FIG. 4) are folded together roof-shaped, simple folding pockets 84, 85 being formed at the gables from the areas lying between the folding lines 31, 55; 32, 56; 33, 63; 34, 64 and closed by sealing (FIGS. 17 and 17a and FIG. 23, operating step 5).

By means of activating elements 86 the outsides of the folding pockets 84, 85 of the areas lying between the folding lines 31', 54; 32', 57; 33', 62; 34', 65 and of the adjacent areas 44, 46 folded together roof-shape between the folding lines 31', 53; 32', 58; 33', 61; 34', 65 are activated for hot sealing (FIG. 23, operating step 6).

Figure 18:
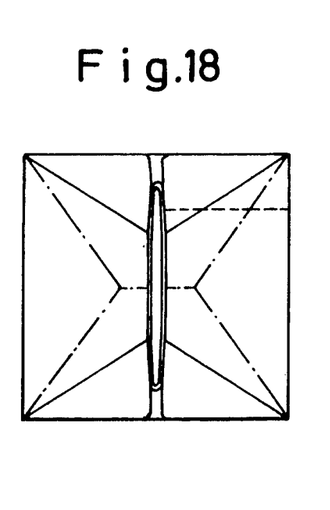
Figure 18A:
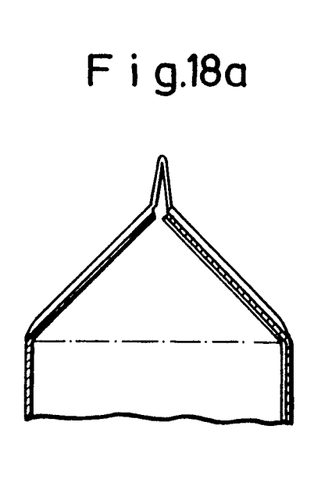
Figure 19:
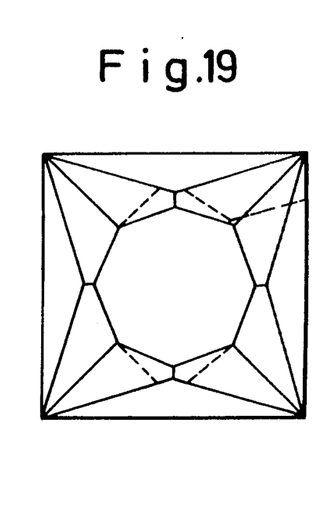
Figure 19A:
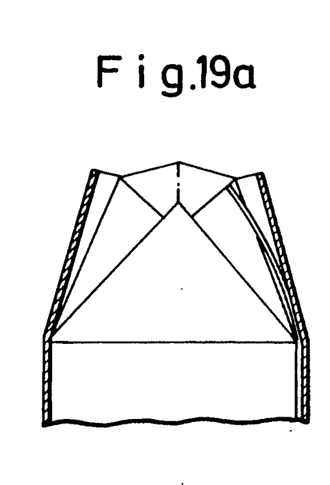

Then, using folding tools 87, the folding pockets 84, 85 are folded over the gable shaping plates 75, 76 and stapled to the areas 44, 46 folded in roof shape, with the formation of further folding pockets (FIGS. 18 and 18a and FIG. 3, operating step 7).

After the gable-forming plates 75, 76 have been lowered, the punch 78 with the spout 2 is introduced from below into the head portion 9 formed into a funnel shape with a circular opening 10. As already mentioned, the mouthpiece of the spout 2 is adapted to the shape and surface structure of the head portion formed by the folding pockets and the seam and so positioned on the head 79 that the mouthpiece is introduced into the opening 10 with a positive connection (FIG. 23, operating step 8).

By means of a sealing tool 88, the edge 22 of the head portion 9 is sealed on to the flange 13 of the spout 11, the flange 13 having hermeticizing and sealing lips 15, 16 (FIG. 23, operating step 9).

After the release of the clamping jaws 80, 81 the body 1 equipped with the spout 2 is drawn off the shaping mandrel 71 (FIG. 23, operating step 10).

If the spout 2 has not already been provided with closure 17 or 20, as shown in FIGS. 12 and 15, it is then provided with a closure, and the container is filled through the open bottom. After being filled it is also closed at the bottom with a web seam closure. Alternatively, first the bottom can be closed and, after being filled, the container can be closed over the open spout with the cap.

I claim:

1. A container for liquids and bulk material formed from a blank having a plurality of sets of folding lines, comprising
   a substantially parallelipipedic body having side walls and lateral edges between said side walls, said lateral edges comprising a first set of folding lines of said blank,
   a funnel-shaped head portion on top of said body, said head portion comprising faces extending from said side walls, said head portion tapering in cross-section towards a central annular opening of predetermined shape,
   said head portion further comprising folding pockets between said faces, said folding pockets being formed from second and third sets of folding lines, said folding pockets being folded inwardly along said second set of folding lines towards the interior of said head portion so that said second set of folding lines constitute interior folds and said third set of folding lines constitute exterior folds of said folding pockets, said second set of folding lines constituting extensions of said first set of folding lines, said second and third sets of folding lines being folded so that said folding pockets are disposed in pairs bearing against interior surfaces of said faces, said folding pockets being sealed to the interior surfaces along said interior folds and along upper edges of said folding pockets so that said folding pockets are closed off to the interior of said head portion, and
   means for pouring said liquid and bulk materials out of the interior of said container disposed from the interior on said funnel-shaped head portion of said container, said pouring means including a flange, said pouring means and said flange being shaped to conform to the predetermined shape of said central annular opening.

2. The container of claim 1 wherein said container is made from cardboard.

3. The container of claim 1 wherein said container is made from a cardboard/plastic multi-layer composite material.

4. The container of claim 1 wherein said pouring means comprises a spout.

5. The container of claim 1 wherein said pouring means comprises an adapter for a spout.

6. The container of claim 1 wherein said central annular opening is polygonal in shape and said pouring means and said flange are polygonal in cross-section to conform to the polygonal shape of said central annular opening.

7. The container of claim 1 wherein said pouring means is sealed to the interior of said head portion.

8. The container of claim 1 wherein said flange has a circumferentially extending sealing lip.

9. The container of claim 1 wherein said annular opening has an upper edge which is located outside of said flange and is covered by a masking ring.

10. The container of claim 1 wherein said blank is rectangular in shape.

11. The container of claim 10 wherein each of said folding pockets is formed from a folding line of said second, third and a fourth set of folding lines radiating from a single point of origin.

12. The container of claim 11 wherein the central folding line of each folding pocket comprises an extension of a folding line which serves as a lateral edge of the body.

13. The container of claim 12 wherein each of said folding pockets is formed from a folding line of a fifth set of folding lines radiating from said point of origin, said folding line of said fifth set of folding lines lying parallel to a folding line of said third set of folding lines when said folding pocket is folded and bears against an interior surface of one of said faces.

14. A container of claim 12 wherein the angles enclosed by the folding lines radiating from said point of origin are substantially equal.

15. The container of claim 1 wherein a lateral seam is formed in the body from said rectangular blank, said lateral seam being located at an upper edge of said central annular opening outside said second, third and fourth sets of folding lines.

16. The container of claim 15 wherein said lateral seam is located inside said folding pockets.

17. The container of claim 15 wherein said lateral seam is located outside said folding pockets.

* * * * *